United States Patent [19]

Tanny et al.

[11] 4,230,830
[45] Oct. 28, 1980

[54] ADHESIVE BLENDS CONTAINING THERMALLY GRAFTED ETHYLENE POLYMER

[75] Inventors: Stephen R. Tanny; Philip S. Blatz, both of Wilmington, Del.

[73] Assignee: E. I. Du Pont de Nemours and Company, Wilmington, Del.

[21] Appl. No.: 25,564

[22] Filed: Mar. 30, 1979

[51] Int. Cl.$^2$ .............................................. C08L 23/26
[52] U.S. Cl. ................................... 525/222; 525/193; 525/207; 525/211; 525/227; 525/240; 428/475.8; 156/182; 156/327
[58] Field of Search ...................... 260/897 B, 876 R; 525/193, 222, 240, 227

[56] References Cited

U.S. PATENT DOCUMENTS

| | | | |
|---|---|---|---|
| 3,284,380 | 11/1966 | Davis | 260/8 |
| 3,595,943 | 7/1971 | Brunson et al. | 260/897 B |
| 3,658,948 | 4/1972 | McConnell | 260/897 B |
| 3,862,265 | 1/1975 | Steinkamp et al. | 260/878 R |
| 3,873,643 | 5/1975 | Wu et al. | 260/878 R |
| 3,884,882 | 5/1975 | Caywood | 260/78.4 D |
| 4,026,967 | 5/1977 | Flexman et al. | 260/878 R |
| 4,087,587 | 5/1978 | Shida et al. | 428/500 |
| 4,087,588 | 5/1978 | Shida et al. | 428/500 |

*Primary Examiner*—Carman J. Seccuro

[57] ABSTRACT

Polymeric blends particularly useful as adhesives for nylon prepared from an ethylene polymer and a second polymer grafted with maleic anhydride.

6 Claims, No Drawings

ADHESIVE BLENDS CONTAINING THERMALLY GRAFTED ETHYLENE POLYMER

BACKGROUND OF THE INVENTION

Nylon films are particularly desirable in packaging applications because of their inherent strength and puncture resistance, grease resistance, thermoformability and oxygen impermeability. In such packaging applications, it has frequently been found desirable to combine a nylon to a second layer of an ethylene polymer or copolymer without the use of a solvent-based adhesive. Particularly satisfactory ethylene copolymers in this application are the "Surlyn ®" ionomer resins which are partially neutralized ethylene/methacrylic acid copolymers commercially available from E. I. du Pont de Nemours and Company. Such ethylene copolymers, when laminated to nylon, provide heat sealability at low temperatures which is particularly desirable in packaging applications.

Bonding of the nylon and ethylene polymer components in such composites is difficult, and the bonds are often weakened on exposure to moisture.

SUMMARY OF THE INVENTION

The instant invention provides a polymeric blend which exhibits strong and durable bonding characteristics to polyamide.

Specifically, the instant invention provides a polymer blend consisting essentially of a. about from 80–99% by weight of a first olefinic polymer selected from
  (i) non-polar ethylene polymers and copolymers having a density of about from 0.930 to 0.965 g/cc and
  (ii) copolymers of ethylene having up to about 30 weight percent of at least one ethylenically unsaturated ester having from 4 to 12 carbon atoms; and
b. about from 1–19% of a second olefinic polymer selected from the group consisting of
  (i) non-polar ethylene polymers and copolymers having a density of about from 0.945 to 0.965 g/cc and
  (ii) terpolymers of ethylene, at least one α-olefin having from 3–6 carbon atoms, and at least one nonconjugated diene;

the second olefinic polymer being thermally grafted with an unsaturated acid or anhydride to give a copolymer having about from 0.02 to 4.0 weight percent of grafted succinic groups, provided, however, that when the second olefinic polymer is (ii), then the first olefinic polymer is (ii).

DETAILED DESCRIPTION OF THE INVENTION

The present invention relates to a blend of two principal polymeric components.

The first component, comprising about from 80–99% of the total blend, is a non-polar ethylene polymer or copolymer. To more closely match the melt viscosity of the present blends with nylon, it is preferred that this first component comprise about from 80 to 99% of the blend. The first olefinic polymer can be a high density ethylene polymer having a density of about from 0.93 to 0.965 g/cc. This higher density material can be an ethylene homopolymer or a copolymer of ethylene with an α-olefin having 3 to 8 carbon atoms. Copolymers of ethylene with octene or butene are particularly preferred. In general, the copolymeric component of these materials comprises about from 1–10 weight percent of the copolymer.

The first olefinic polymer used in the present invention can also be a copolymer of ethylene and one or more ethylenically unsaturated esters. The ethylenically unsaturated ester can comprise up to about 30% of the copolymer. Particularly satisfactory unsaturated esters which can be used are those having from 4 to 12 carbon atoms, such as vinyl acetate, ethyl acrylate, methyl methacrylate, methyl acrylate, dimethyl maleate, diethyl maleate, dibutyl maleate and isobutyl acrylate. Such copolymers can also comprise minor amounts of other copolymeric components such as carbon monoxide and methacrylic acid, which do not substantially change the overall character of the ethylene/unsaturated ester copolymer.

The second component of the present polymeric blends is a second olefinic polymer which is thermally grafted with about from 0.02 to 4.0 percent succinic groups. This grafted olefinic polymer is the minor component of the polymer blend, comprising about from 1–19% by weight of the final polymer blend.

The backbone polymer from which this grafted olefinic polymer can be prepared can be similar to the non-polar ethylene polymers and copolymers used for the first component. Thus, this backbone can be ethylene homopolymer or a copolymer of ethylene with an α-olefin having from 3 to 8 carbon atoms. However, it has been found that the backbone polymer used for the grafted component of the polymer blend preferably has a somewhat higher density than those of the nongrafted component. The ethylene polymers and copolymers used for the grafted component exhibit a density of about from 0.945 to 0.965 g/cc.

A second class of polymers which can be used as the backbone for the grafted component of the present polymer blends are terpolymers of ethylene, at least one α-olefin having from 3–6 carbon atoms, and at least one nonconjugated diene. Preparation of these terpolymers as well as those grafted with succinic groups is described in detail in Caywood, Jr. U.S. Pat. No. 4,010,223, which is hereby incorporated by reference.

The backbone polymers and copolymers are grafted with about from 0.02 to 4.0 percent by weight of succinic groups. It has been found that less than 0.02 weight percent gives little appreciable improvement in the bonding characteristics of the present blends to nylon, whereas graft levels in excess of 4.0 weight percent tend to undesirably decrease the melt index of the resulting polymer blends.

The succinic groups are generally grafted onto the backbone polymer by the addition of fumaric acid, which, in the grafting reaction, isomerizes to maleic acid and maleic anhydride. For reasons not fully understood, it is necessary to carry out the grafting reaction by thermal grafting techniques, such as those described in detail in Flexman, Jr. et al. U.S. Pat. No. 4,026,967, hereby incorporated by reference. Other grafting techniques, such as those using a free radical initiator such as a hydroperoxide, apparently so markedly decrease the melt index of the grafted product as to render it unsuitable for use in adhesive or extrusion applications. Such results are illustrated, for example, in Shida et al. U.S. Pat. No. 3,873,643.

While a wide variety of grafting levels can be used in the instant invention, the optimum graft level will, of course, vary with the particular backbone selected. For example, a graft level of 0.1 to 4.0 percent is preferred for backbones of ethylene/propylene/diene, while a graft level of 0.1 to 2.0 percent is preferred for ethylene polymer backbones.

The polymeric components of the present invention can be blended by any convenient melt blending technique. In general, more uniform and desirable performance characteristics will be obtained with more intimate blending of the components. It has been found convenient in the present invention to first admix the two polymeric components by melt blending on a roll mill, followed by further blending in the extrusion apparatus used to prepare a film of the polymer blend.

In preparing blends of the two polymer components, it has been found that high density ethylene polymer backbones grafted with succinic groups provide excellent results when used in combination with any of the first olefinic polymers. However, when the backbone polymer for the grafted component is an ethylene/propylene/diene terpolymer, it is preferred that the first olefinic polymer be a copolymer of ethylene and ethylenically unsaturated esters. It has been found that the markedly superior compatibility of these terpolymers and polar copolymers results in particularly outstanding adhesion to nylon.

The compositions of the present invention exhibit excellent adhesion to nylon. Accordingly, the present compositions can be used as an adhesive layer to bond nylon to a heat sealable film such as a polyolefin or ethylene vinyl acetate film or one prepared from a partially neutralized ethylene methacrylic acid ionomeric resin. Alternatively, the compositions of the present invention can be coextruded with polyamide without additional film layers to provide, by themselves, improved heat sealing characteristics. The adhesive character of the instant compositions for both nylon and ethylene polymer films exhibits outstanding durability, even on extended exposure to moist or wet environments.

The invention is further illustrated by the following specific examples, in which parts and percentages are by weight unless otherwise indicated. In the peel tests in the Examples, "p" indicates that the seal peeled apart, "t" indicates that the film tore at the seal edge, and "p-t" indicates that the seal peeled part way and the film then tore.

EXAMPLE 1

On an electrically heated two roll mill having three inch diameter rolls and heated to a temperature of 180° C. were placed (a) 45 grams of an ethylene/vinyl acetate copolymer containing 8½ percent vinyl acetate and having a melt index of 1.92; and (b) 5 grams of a high density polyethylene having a melt index of 2.8 and a density of 0.960 g/cc and grafted with 1% succinic acid or anhydride groups. The blend was mixed on the mill for 10 minutes and then removed and cooled.

Film was prepared from the polymer blend by pressing at 160° C. for one minute between Teflon® fluoropolymer sheets to yield a film having a thickness of 2-4 mils.

Two films of one mil nylon were bonded with the polymer blend films of the present invention using a "Sentinel" one-inch wide bar sealer commercially available from Packaging Industries Inc. The bar sealer was operated at 6 seconds dwell time, 30 psi on the bar, at a variety of temperatures as reported in Table I. The heat seals were then tested for adhesion by peeling the two nylon films apart using a Suter Tester commercially available from the Alfred Suter Company. The tests were conducted at a peel rate of 12 inches per minute. One half inch wide samples were cut from the heat seals and the force required to peel the seals was reported in grams per inch width of seal. The results are reported in Table I.

The heat seals were also tested after exposure to hot water for a various lengths of time. The results are reported in Table II.

EXAMPLE 2

In Example 2, the general procedure of Example 1 is repeated, except that instead of the ethylene vinyl acetate copolymer used in Example 1, a like amount of ethylene vinyl acetate copolymer containing 5% vinyl acetate and having a melt index of 2.0 is used.

The samples were tested, and the results reported in Tables I and II.

TABLE I

PEEL STRENGTHS OF HEAT SEALS
1 mil Nylon 6 Film/Adhesive/1 mil Nylon 6 Film

| Temperature Used to Make Heat Seal | Seal Strengths g/inch | |
|---|---|---|
| | Example 1 | Example 2 |
| 140°–150° C. | 600 p | 200 p |
| 170°–175° C. | 1800 p | 800 p |
| 225° C. | 2800 p | 2000 p |
| 225°–240° C. | >3000 t | 3200 p |

TABLE II

PEEL STRENGTHS OF HEAT SEALS ON IMMERSION IN WATER

| Heat Seal Exposure Conditions | Heat Seal Peel Strength | |
|---|---|---|
| | Example 1 | Example 2 |
| As Made (control) | 3150 p-t | 2200 p |
| After 10 min immersion in 80° C. water | >1000 | >2800 t |
| After 2 hour immersion in 80° C. water | >2000 t | 1400 p |

EXAMPLE 3

Using a 53 mm twin screw extruder a melt blend was produced from (a) 285 lbs of an E/9% VA copolymer having a melt index of 2.0 and (b) 15 lbs of a HDPE having a density of 0.960 g/cc and a melt index of 2.8 and grafted with 1% maleic anhydride producing a graft copolymer of MI=13.4. These components were blended at 221°–224° C. and the extrusion blending rate was 19.5 lbs/hr.

Laminates with nylon 6 film were prepared substantially as in Example 1, maintaining the bar sealer at 175° C. Preformed or coextruded films were used. With the preformed films, three layer laminates of nylon 6 film/adhesive film/nylon 6 film were prepared. Heat seals were prepared from coextruded nylon 6/adhesive composites by sealing the adhesive sides of the coextruded laminates together.

The laminates were immersed in water for various times and temperatures and tested for adhesive bond strength. The results are summarized in Table III.

TABLE III

| | HEAT SEAL PEEL STRENGTH AFTER IMMERSION IN WATER (g/in) | | |
|---|---|---|---|
| | Preformed Nylon/Adhesive/Nylon | Coextruded Nylon/Adhesive/Nylon | |
| Exposure | | 2 mils adhesive | ½ mil adhesive |
| None | 3500 t | 3500 t | 2500 p |
| One Hour Ambient Air | 3500 t | 3500 t | 2600 p |
| One Hour Ambient Water | 2100 t | 3300 p | 2300 p |
| One Hour 80° C. Water | 2400 t | 3300 p | 2400 p |
| 70 Hours Ambient Water | 2400 p | 3250 p | 2350 p |

EXAMPLES 4–8

In Examples 4–8, the general procedure of Example 1 was repeated, using 95% ethylene vinyl acetate copolymer and 5% of a high density polyethylene grafted with one percent maleic anhydride having a melt index of 13.0. The composition and melt index of the ethylene vinyl acetate copolymers is indicated in Table IV.

Nylon film laminates were prepared as in Example 1 and tested for seal durability on exposure to water. The results are summarized in Table V.

TABLE IV

| Example | Description | Melt Index |
|---|---|---|
| 4 | E/3.5% VA | 0.5 |
| 5 | E/12% VA | 0.25 |
| 6 | E/12% VA | 20.0 |
| 7 | E/18% VA | 0.7 |
| 8 | E/28% VA | 6.0 |

TABLE V

| | HEAT SEAL PEEL STRENGTH AFTER IMMERSION IN WATER | | | | |
|---|---|---|---|---|---|
| Exposure | Ex. 4 | Ex. 5 | Ex. 6 | Ex. 7 | Ex. 8. |
| None | 2400 p | 3000 t | 2400 t | 1900 p | 1500 p |
| One Hour Ambient Air | 2250 p | 2700 p | 1400 p | 1900 p | 900 p |
| One Hour Ambient Water | 1400 p | 2600 t | 1500 p | 1600 p | 700 p |
| One Hour 80° C. Water | 2000 t | 2700 t | 1500 p | 2400 p | 300 p |
| 70 Hours Ambient Water | 2200 p | 2500 p | 1700 p | 2200 p | 800 p |

EXAMPLES 9–33

In Examples 9–33, the general procedure of Example 1 was repeated, using the components and with the results indicated in Table VI (A) (B) (C).

TABLE VI

(A) MAJOR COMPONENT

| Example | Description | Melt Index | Amount in Blend % |
|---|---|---|---|
| 9 | E/3½% VA | 0.5 | 98 |
| 10 | E/7½% VA | 1.2 | 98 |
| 11 | E/9% VA | 2.0 | 98 |
| 12 | E/9% VA | 2.0 | 98 |
| 13 | E/9% VA | 2.0 | 95 |
| 14 | E/10% MMA | 5.0 | 95 |
| 15 | E/10% MMA | 5.0 | 95 |
| 16 | E/20% MMA | 3.0 | 95 |
| 17 | E/27% MA/10% CO | 1.0 | 95 |
| 18 | E/17.7% IBA/.5% MMA | 0.7 | 95 |
| 19 | E/23% IBA | 2.1 | 95 |
| 20 | E/8.9% MA | 0.8 | 95 |
| 21 | E/9% VA | 2.0 | 90 |
| 22 | E/9% VA | 2.0 | 99 |
| 23 | E/10% DEM (diethyl maleate) | 4.0 | 95 |
| 24 | HDPE(0.960 g/cc) | 2.8 | 95 |
| 25 | HDPE(0.950 g/cc) | 1.2 | 95 |
| 26 | HDPE(0.944 g/cc) | 0.25 | 95 |
| 27 | HDPE(0.944 g/cc) | 0.25 | 98 |
| 28 | HDPE(0.940 g/cc) | 4.0 | 95 |
| 29 | HDPE(0.931 g/cc) | 2.0 | 95 |
| 30 | LDPE(0.923 g/cc) | 4.5 | 95 |
| 31 | LDPE(0.917 g/cc) | 6.5 | 90 |
| 32 | HDPE(0.960 g/cc) | 2.8 | 90 |
| 33 | HDPE(0.960 g/cc) | 2.8 | 95 |

(B) MINOR COMPONENT

| Example | Description | Melt Flow 9/10 min | Melt Flow Temperature °C. | Amount in Blend % |
|---|---|---|---|---|
| 9 | Polymer A* | 13.0 | 190 | 2 |
| 10 | Polymer B** | 2.5 | 280 | — |
| 11 | Polymer A | 13 | 190 | 2 |
| 12 | Polymer B | 2.5 | 280 | 2 |
| 13 | Polymer B | 2.5 | 280 | 5 |
| 14 | Polymer A | 13 | 190 | 5 |
| 15 | Polymer B | 2.5 | 280 | 5 |
| 16 | Polymer A | 13 | 190 | 5 |
| 17 | Polymer A | 13 | 190 | 5 |
| 18 | Polymer A | 13 | 190 | 5 |
| 19 | Polymer A | 13 | 190 | 5 |
| 20 | Polymer A | 13 | 190 | 5 |
| 21 | HDPE-g-.41% succinic groups | 16 | 190 | 10 |
| 22 | HDPE-g-1.76% succinic groups | 16 | 190 | 1 |
| 23 | Polymer A | 13 | 190 | 5 |
| 24 | Polymer A | 13 | 190 | 5 |
| 25 | Polymer A | 13 | 190 | 5 |
| 26 | Polymer A | 13 | 190 | 5 |
| 27 | Polymer A | 13 | 190 | 2 |
| 28 | Polymer A | 13 | 190 | 5 |
| 29 | Polymer A | 13 | 190 | 5 |
| 30 | Polymer A | 13 | 190 | 5 |
| 31 | Polymer A | 13 | 190 | 10 |
| 32 | LDPE-g-.64% ANH (Density = .923) | 32 | 280 | 10 |
| 33 | Polymer B | 2.5 | 280 | 5 |

*High Density Polyethylene grafted with 1% succinic groups.
**Ethylene, Propylene, Hexadiene terpolymer grafted with 2% succinic groups.

(C) PEAL STRENGTH

| Example | Initial Heat Seal Peel Strength grams/inch | Heat Seal Temperature °C. |
|---|---|---|
| 9 | 2400 (peel) | 185 |
| 10 | 2000 (peel) | 195 |
| 11 | >1400 (tear)* | 205 |
| 12 | 3600 (peel) | 195 |
| 13 | >3000 (tear)* | 205 |
| 14 | >3200 (tear)* | 175 |
| 15 | >3600 (tear)* | 190 |
| 16 | 3000 (peel) | 175 |
| 17 | >1000 (tear)* | 195 |
| 18 | >3000 (tear)* | 195 |
| 19 | 3200 (peel) | 200 |
| 20 | 3000 (peel) | 200 |
| 21 | 3400 (peel) | 195 |
| 22 | >3200 (tear)* | 205 |
| 23 | 1600 (peel) | 200 |
| 24 | 2400 (peel) | 195 |
| 25 | 2600 (peel) | 200 |
| 26 | >3600 (tear)* | 200 |
| 27 | >3000 (tear)* | 205 |

TABLE VI-continued

| 28 | 2600 (peel)  | 200 |
| 29 | >2000 (tear)* | 200 |
| 30 | 600 (peel)   | 195 |
| 31 | 600 (peel)   | 205 |
| 32 | 0            |     |
| 33 | 400 (peel)   | 195 |

*Film tore adjacent to the bond.

We claim:

1. A polymer blend consisting essentially of
   a. about from 80–99% by weight of a first olefinic polymer selected from
      (i) non-polar ethylene polymers and copolymers having a density of 0.930 to 0.965 g/cc and
      (ii) copolymers of ethylene having up to about 30 weight percent of at least one ethylenically unsaturated ester having from 4 to 12 carbon atoms; and
   b. about from 1–19% of a second olefinic polymer selected from the group consisting of
      (i) non-polar ethylene polymers and copolymers having a density of about from 0.945 to 0.965 g/cc and
      (ii) terpolymers of ethylene, at least one α-olefin having from 3–6 carbon atoms, and at least one nonconjugated diene;
   the second olefinic polymer being thermally grafted with unsaturated acid or anhydride to give a copolymer having about from 0.02 to 4.0 weight percent of grafted succinic groups, provided, however, that when the second olefinic polymer is (ii), then the first olefinic polymer is (ii).

2. A polymer blend of claim 1 wherein the first olefinic polymer is an ethylene/vinyl acetate copolymer.

3. A polymer blend of claim 2 wherein the second olefinic polymer is an ethylene/propylene/hexadiene terpolymer grafted with succinic groups.

4. A polymer blend of claim 2 wherein the second olefinic polymer is an ethylene polymer grafted with succinic groups.

5. A copolymer blend of claim 1 wherein the first olefinic polymer is an ethylene/methyl acrylate copolymer.

6. A copolymer blend of claim 1 wherein the first olefinic polymer is an ethylene/isobutyl acrylate copolymer.

* * * * *

UNITED STATES PATENT OFFICE
CERTIFICATE OF CORRECTION

PATENT NO. : 4,230,830
DATED : October 28, 1980
INVENTOR(S) : Tanny et al.

It is certified that error appears in the above–identified patent and that said Letters Patent are hereby corrected as shown below:

On the title page, item [75] should read:

Inventors: Stephen R. Tanny; Philip S. Blatz, both of Wilmington, Del. and Kenneth Y. Wright, Jr. of Hockessin, Del.

Signed and Sealed this

Seventeenth Day of March 1981

[SEAL]

Attest:

RENE D. TEGTMEYER

*Attesting Officer*    *Acting Commissioner of Patents and Trademarks*

REEXAMINATION CERTIFICATE (1271st)
United States Patent [19]

Tanny et al.

[11] B1 4,230,830

[45] Certificate Issued  May 8, 1990

[54] ADHESIVE BLENDS CONTAINING THERMALLY GRAFTED ETHYLENE POLYMER

[75] Inventors: Stephen R. Tanny; Philip S. Blatz, both of Wilmington; Kenneth Y. Wright, Jr., Hockessin, all of Del.

[73] Assignee: E. I. Du Pont de Nemours and Company, Wilmington, Del.

Reexamination Request:
No. 90/001,672, Dec. 19, 1988

Reexamination Certificate for:
Patent No.: 4,230,830
Issued: Oct. 28, 1980
Appl. No.: 25,564
Filed: Mar. 30, 1979

Certificate of Correction issued Jan. 19, 1981.

[51] Int. Cl.$^5$ .................. C08L 23/26; C08L 23/08
[52] U.S. Cl. .................. 525/222; 156/182; 156/327; 428/475.8; 525/193; 525/207; 525/211; 525/227; 525/240; 525/74; 525/78
[58] Field of Search .................. 525/74, 78, 193, 207, 525/222, 227, 240

[56] References Cited
FOREIGN PATENT DOCUMENTS 52-32654  8/1977  Japan.
54-00082  1/1979  Japan.

*Primary Examiner*—Wilbert J. Briggs, Sr.

[57] ABSTRACT

Polymeric blends particularly useful as adhesives for nylon prepared from an ethylene polymer and a second polymer grafted with maleic anhydride.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 4 are cancelled.

Claims 3, 5 and 6 are determined to be patentable as amended.

New claim 7 is added and determined to be patentable.

3. A polymer blend of claim [2] *7* wherein *the first olefinic polymer is an ethylene/vinyl acetate copolymer and* the second olefinic polymer is an ethylene/propylene/hexadiene terpolymer grafted with succinic groups.

5. A copolymer blend of claim [1] *7* wherein the first olefinic polymer is an ethylene/methyl acrylate copolymer.

6. A copolymer blend of claim [1] *7* wherein the first olefinic polymer is an ethylene/isobutyl acrylate copolymer.

*7. A polymer blend consisting essentially of*
  *a. about from 80–99% by weight of a first olefinic polymer which is a copolymer of ethylene having up to about 30 weight percent of at least one ethylenically unsaturated ester having from 4 to 12 carbon atoms; and*
  *b. about from 1–19% of a second olefinic polymer which is an ethylene/propylene/hexadiene terpolymer grafted with succinic groups;*
*the second olefinic polymer being thermally grafted at a temperature of 225°–350° C. with unsaturated acid or anhydride to give a copolymer having about from 1.0 to 4.0 weight percent of grafted succinic groups.*

* * * * *